(12) United States Patent
Vassigh et al.

(10) Patent No.: US 9,420,338 B1
(45) Date of Patent: Aug. 16, 2016

(54) APPARATUS AND METHOD FOR PROVIDING POWER ON AND POWER OFF FOR A DISPLAY DEVICE

(71) Applicant: Roku, Inc., Saratoga, CA (US)

(72) Inventors: Ali Vassigh, San Jose, CA (US); David Westerhoff, Fremont, CA (US); Jeff Anderson, Cottonwood Heights, UT (US)

(73) Assignee: Roku, Inc., Saratoga, CA (US)

( * ) Notice: Subject to any disclaimer, the term of this patent is extended or adjusted under 35 U.S.C. 154(b) by 0 days.

(21) Appl. No.: 14/582,117

(22) Filed: Dec. 23, 2014

Related U.S. Application Data

(60) Provisional application No. 61/923,598, filed on Jan. 3, 2014.

(51) Int. Cl.
*H04N 21/443* (2011.01)
*H04N 21/2665* (2011.01)
*H04N 21/462* (2011.01)
*H04N 21/472* (2011.01)
*H04N 21/422* (2011.01)
*H04N 21/433* (2011.01)
*H04N 21/438* (2011.01)

(52) U.S. Cl.
CPC ....... *H04N 21/4432* (2013.01); *H04N 21/2665* (2013.01); *H04N 21/42204* (2013.01); *H04N 21/433* (2013.01); *H04N 21/4383* (2013.01); *H04N 21/4436* (2013.01); *H04N 21/4622* (2013.01); *H04N 21/47217* (2013.01)

(58) Field of Classification Search
CPC ............ H04N 21/443; H04N 21/2665; H04N 21/462; H04N 21/472; H04N 21/422; H04N 21/433; H04N 21/438
See application file for complete search history.

(56) References Cited

U.S. PATENT DOCUMENTS

| | | | | |
|---|---|---|---|---|
| 5,430,493 A | * | 7/1995 | Kim | H04N 5/445 348/564 |
| 5,818,439 A | * | 10/1998 | Nagasaka | G06F 17/30793 348/E7.073 |
| 2004/0250294 A1 | * | 12/2004 | Kim | G11B 27/105 725/135 |
| 2005/0201254 A1 | * | 9/2005 | Looney | G06F 17/30017 369/124.01 |
| 2012/0167127 A1 | * | 6/2012 | Uchida | H04N 21/4223 725/14 |
| 2014/0181497 A1 | * | 6/2014 | Dominicus | G06F 8/65 713/2 |

* cited by examiner

*Primary Examiner* — John Schnurr
(74) *Attorney, Agent, or Firm* — Sterne, Kessler, Goldstein & Fox P.L.L.C.

(57) ABSTRACT

A streaming media device includes a controller to receive a power off signal, bookmark streamed content at a current location of play after receiving the power off signal, and present a home screen with a visual representation of an alternative content selection and channel selection for a predefined period of time.

11 Claims, 6 Drawing Sheets

APPARATUS AND METHOD FOR PROVIDING POWER ON AND POWER OFF FOR A DISPLAY DEVICE

CROSS-REFERENCE TO RELATED APPLICATIONS

This application claims priority to U.S. Provisional Patent Application Ser. No. 61/923,598, filed on Jan. 3, 2014, which is incorporated herein by reference.

FIELD OF INVENTION

The present invention relates generally to communication networks. More specifically, the present invention relates to powering on and off a device utilized to stream content over a network.

BACKGROUND

Streaming content is a method of continuously sending audio and/or video files from a content provider to a user through a communications network such as the Internet. Upon receiving or downloading a stream or sequence of audio/video files, a portion of the files are used for displaying images and another portion of the files are buffered for subsequent display.

A drawback associated with streaming content through a television or monitor is that after the television is turned off and then turned back on, the television typically does not know how to resume a streaming session.

SUMMARY

A streaming media device includes a controller to receive a power off signal, bookmark streamed content at a current location of play after receiving the power off signal, and present a home screen with a visual representation of an alternative content selection and channel selection for a predefined period of time.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
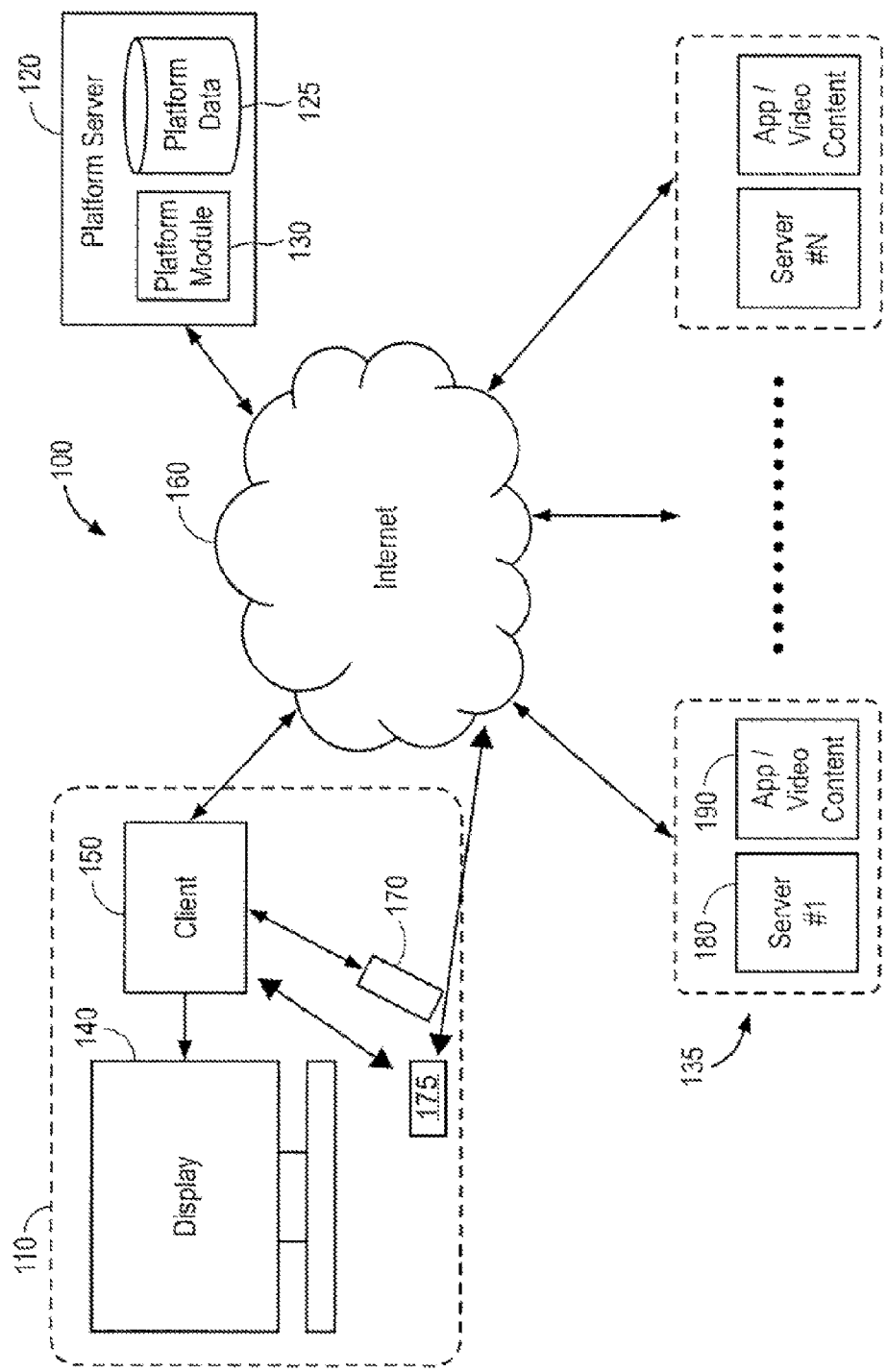
FIG. 1 is a block diagram illustrating a communication network capable of streaming content in accordance with one embodiment of the present invention.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 is a block diagram illustrating a communication network capable of streaming content in accordance with one embodiment of the present invention. In one aspect, the streaming environment 100 includes an interface system 110, a platform server 120, and one or more sources of content programming 135. In one embodiment, the interface system 110 includes a display device 140 (e.g. monitor and television), a client device 150 (e.g. streaming player), and a user input device 170. The client device 150 is configured to communicate with the display device 140 and a network 160.

In one embodiment, the platform server 120 includes a database 125 and a platform module 130. The database 125 is configured to store data such as programming software packages. The data within these programming software packages include the network locations and content descriptions of content sources 135, hardware/software capabilities of different firmware versions and specifications of the client device 150, customer data associated with each client device 150, and user interface information associated with the client device 150.

In one embodiment, the customer data includes customer specific information such as demographic data, geographic data, ISP identification, and financial information. In one embodiment, the platform server 120 generates customized user interfaces for each of the client devices 150. In one embodiment, the user interface from the platform server 120 provides a selection of content such as audio, visual, and gaming content to the client device 150. In this example, the platform server 120 is configured to supply a graphical representation of the selected content to the client device 150 and further allows the client device 150 to select and access individual content from the selected content from the content source 135 through this graphical representation of the selection content.

In one embodiment, the platform server 120 is configured to receive input from client device 150 and processes the input through the platform module 130. The input from the client device 150 includes navigation and selection commands which may represent selection of content, search for content, and ongoing interaction with an application running on the platform server 120.

In one embodiment, the client device 150 displays content on display device 140. In one embodiment, the content displayed on the display device is sourced from one of the client device 150, the platform server 120, and the content source 135. In one embodiment, the input device 170 transmits signals to the client device 150. For example, the input device 170 utilizes one of or a combination of: an infrared signal, radio frequency signal, and Bluetooth signal to communicate with the client device 150.

The input device 170 is configured to enter data and to make user selections from the interface as presented through the client device 150. In one embodiment, the interface displayed by the client device 150 may be from the platform server 120, from the content sources 135, or be locally generated by the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets, and mobile computers.

In one embodiment, the content sources 135 include a server 180 and a storage device with content 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications, and the like. In one embodiment, the particular content which is stored within the storage device 190 is provided to the client device 150 through the network 160. The network 160 for example is the Internet. Alternatively, the network 160 is a local area network.

In one embodiment, the client device 150 makes a request for specific content. If the requested content is video content, the storage device 190 transmits video data that represents the specific video content to the client device 150 through the content source 135.

In one embodiment, platform server 120 supports interfaces, such as login interfaces, search interfaces, and customized interfaces for the client device 150.

Figure 2:
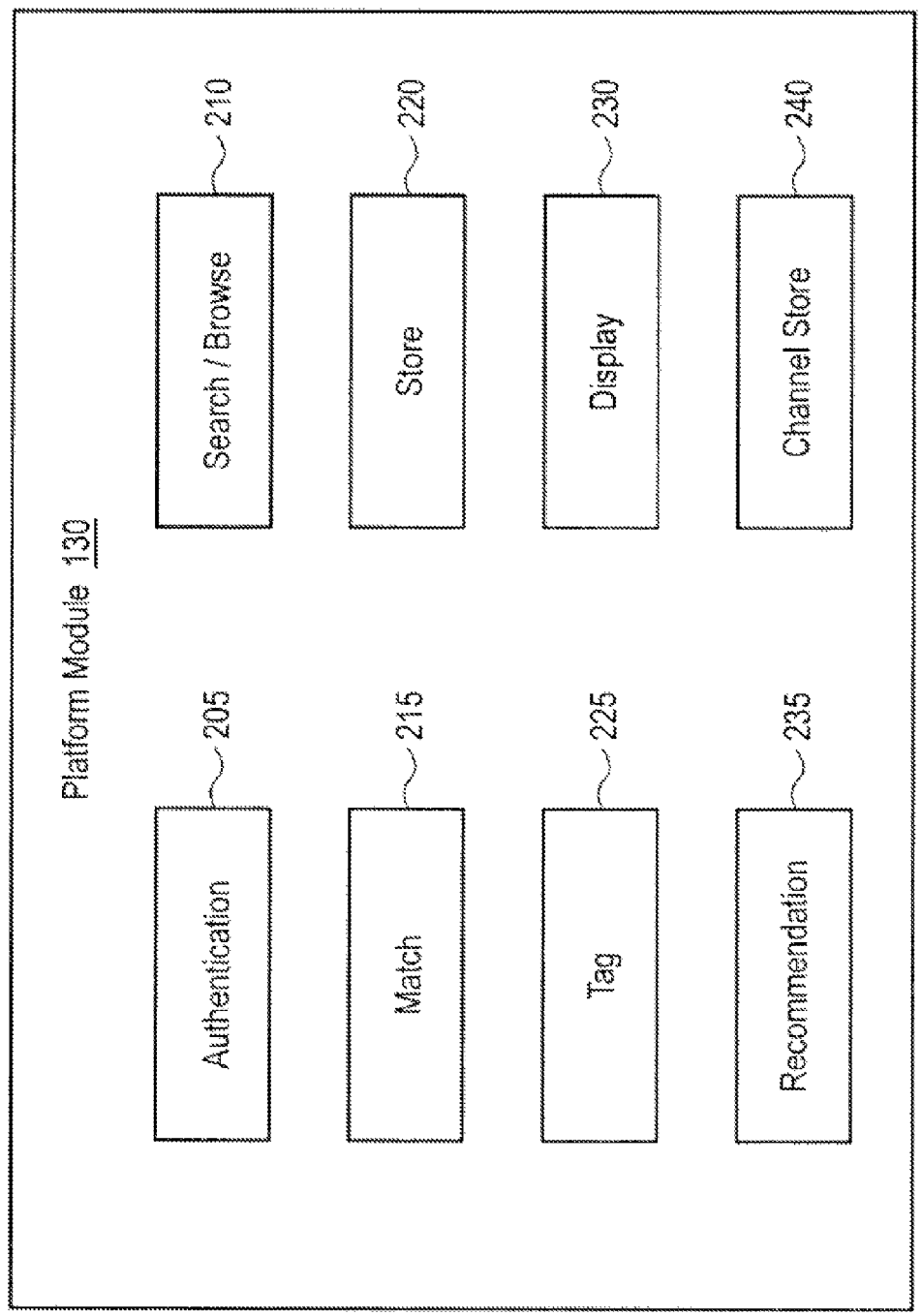
FIG. 2 is a block diagram illustrating a platform module able to manage streaming content in accordance with one embodiment of the present invention.

FIG. 2 is a block diagram illustrating a platform module 130 able to manage streaming content in accordance with one embodiment of the present invention. The representative platform module 130 includes an authentication module 205, a search/browse module 210, a match module 215, a store module 220, a tag module 225, a display module 230, a recommendation module 235, and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information, and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions, or periodically as needed.

The search/browse module 210 is configured to detect input from a client device 150 and/or the input device 170. In one embodiment, the input represents the selection of a channel, content, or application. In another embodiment, the input represents a textual, visual, or audible search for content, a channel, or application. In yet another embodiment, the input represents browsing content, channels, or applications.

The match module 215 coordinates searches and requests for content, channels, and applications. For example, the match module 215 identifies relevant content, channels, and applications based upon the search criteria. In one embodiment, the match module 215 relies on titles, tags, descriptions and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, tags and friends. Depending on the nature of the data, access to the content is controlled to prevent unauthorized use.

The tag module 225 coordinates the creation and use of tags associated with content, channels, and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and be searched by the user creating the tags or the tags can be aggregated among multiple users and searched through a public database by others.

The display module 230 coordinates display of representative content and user interfaces from the platform server 120 to each of the client devices 150. Examples of representative content include listings and descriptions of channels, content and applications. Further, the user interface is configured to allow searching and browsing for channels, contents and applications.

The recommendation module 235 is configured to process content recommendations based on a combination of current subscriptions, browsing or searching input, and content source. Further, the recommendation module 235 also can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can utilize the subscription data associated with each user account to determine whether the content is available to the user without additional charge because the account user is already subscribed to the content provider. Further, the recommendation module 235 can prioritize content that is available free of charge without any subscriptions. In another embodiment, the recommendation module 235 can prioritize content based on popularity ratings as illustrated under the public viewing data 335.

The channel store module 240 is configured to manage subscriptions of channels associated with each client device 150. Channels often contain content such as video content and audio content. In one embodiment, access to the content within a channel requires a subscription to that channel and the subscription is free. In another embodiment, access to the content within a channel requires a paid subscription. In yet another embodiment, access to some content and applications require payment and a subscription. In one embodiment, the channel store module 240 manages the addition of channels, content and applications. Similarly, the channel store module 240 also manages deletion or modifications to channels, content and applications.

Figure 3:
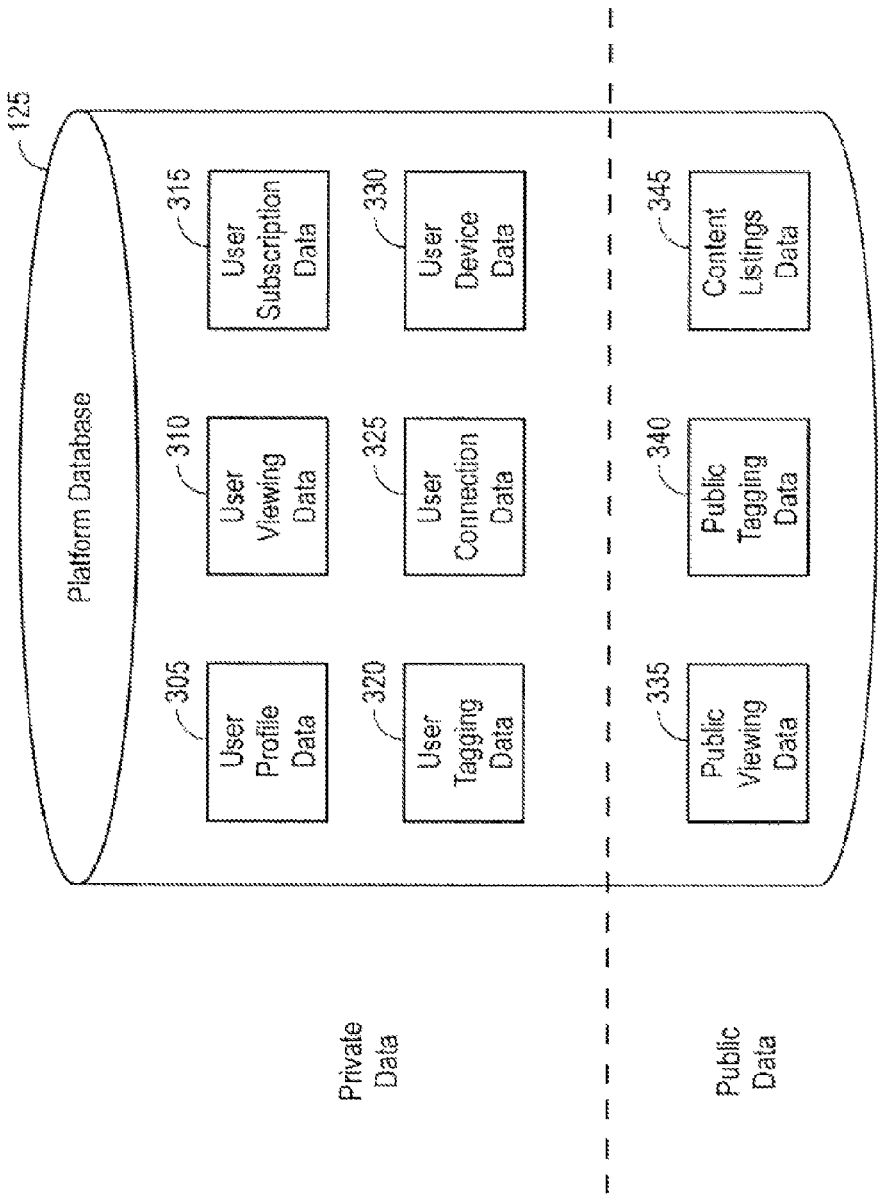
FIG. 3 is a block diagram illustrating a platform data in a server configured to store user related information in accordance with one embodiment of the present invention.

FIG. 3 is a block diagram illustrating a platform database 125 in a server configured to store user related information in accordance with one embodiment of the present invention. In one embodiment, the platform database 125 includes private data and public data. The private data contains information which is identifiable with a particular user; the public data contains information that is aggregated and not identifiable with a particular user. The private data within the platform database 125 includes user profile data 305, user viewing data 310, user subscription data 315, user tagging data 320, user connection data 325, and user device data 330. The public data within the platform database 125 includes public viewing data 335, public tagging data 340 and content listing data 345.

In one embodiment, utilization of the private data is restricted to access within the platform server 120 and access by the particular user corresponding to the private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based, or voice based search. In another embodiment, the stored searches are implicitly identified by recording browsing choices.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The device includes a client device 150, an input device 170 and a mobile device such as a tablet, laptop computer or smart phone.

The public viewing data 335 includes a listing of channels, content and applications utilized by many users. In one embodiment, the popularity of the content is ranked based on the number of viewers and the order in which the content is viewed. For example, the higher number of views per day for content would indicate higher popularity. Further, when multiple content entities are presented next to each other, the content entity which is selected first for viewing is given a higher popularity rating.

The public tagging data 340 includes tags that are utilized to describe channels, content and applications from many users. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
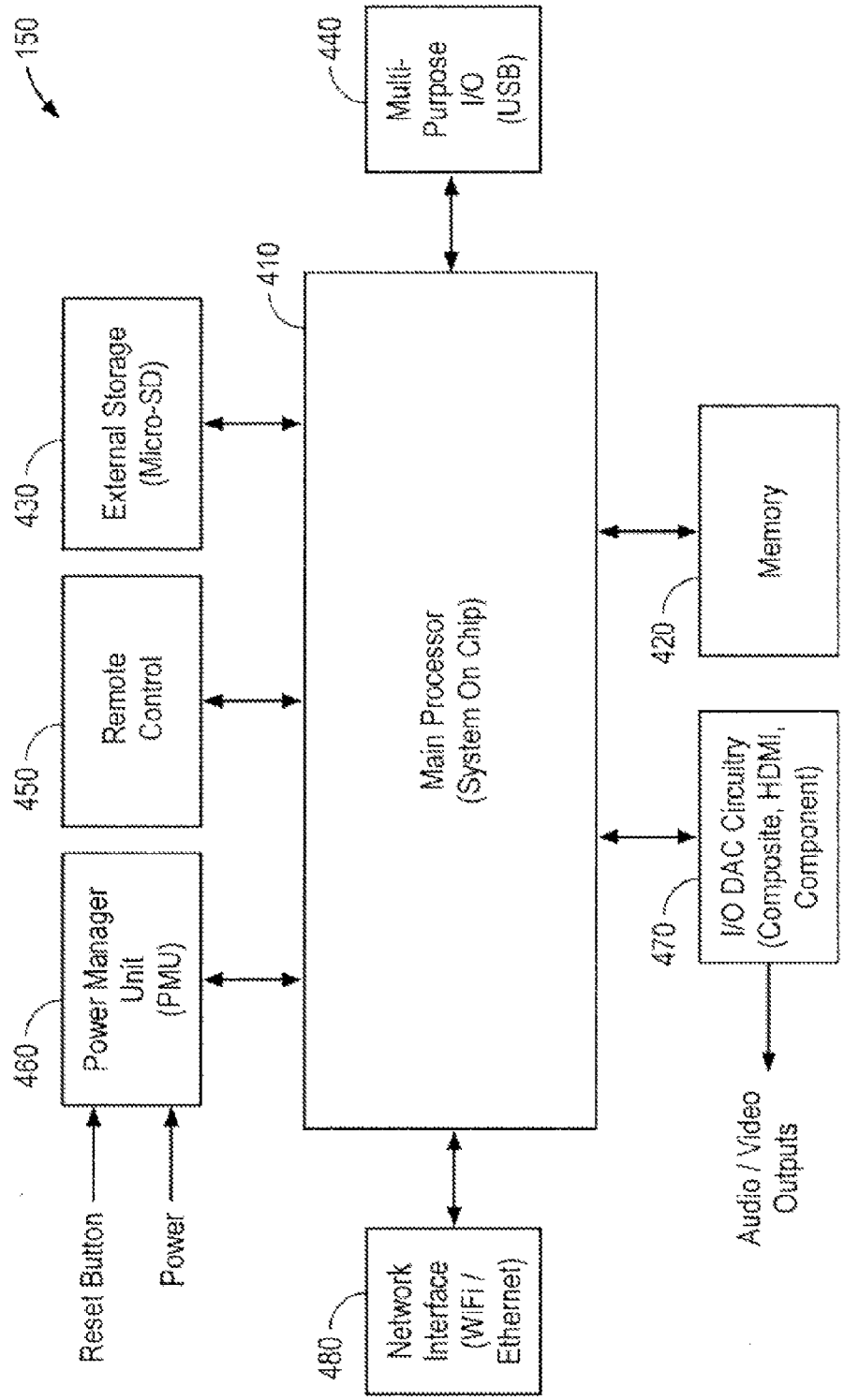
FIG. 4 is a block diagram illustrating a client device configured to handle data streams in accordance with one embodiment of the present invention.

FIG. 4 is a block diagram illustrating a client device 150 configured to handle data stream slows in accordance with one embodiment of the present invention. In one embodiment, the client device 150 is configured to stream content into the device. The content streamed into the client device 150 includes audio content, visual content and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory and read only memory (ROM). Additional memory and memory interfaces such as the multipurpose I/O port 440 may be provided in various embodiments, to support memories such as the external storage 430 which can include hard disks, Universal Serial Bus (USB) drives, Secure Digital (SD) cards and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF) and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL), and composite video. In one embodiment, USB and Apple® Thunderbolt® enabled displays are also supported.

In one embodiment, the network interface 480 supports multiple network interfaces such as Ethernet, Wi-Fi and Bluetooth. In another embodiment, the network interface 480 also supports coaxial, digital TV antenna and satellite television.

Streaming content through a television faces unique challenges versus traditional broadcast television. In the case of a traditional broadcast television model, the broadcast content continues to be distributed whether or not a viewing device is displaying the broadcast content. For example, the traditional broadcast television model distributes the content on a temporal basis which makes the content available only at a given time.

One embodiment of the present invention discloses a media streaming device capable of improving streaming efficiency using a bookmark during a power-on and/or power-off scenario. In one aspect, upon displaying visual images in accordance with streaming content obtained over a communication network, a power off signal requesting to turn off the display device is received. After bookmarking the streaming content at a current location of play after receiving the power off signal, a home screen showing a visual representation of alternative content selection and channel selection is displayed for a predefined waiting period of time. The display device presents a power off screen after the expiration of the predefined waiting period of time.

The bookmark, in one embodiment, is retrieved when the display device is activated. For example, upon receiving a power on signal requesting to turn on the display device, a power on screen and audible power on indicator are transmitted to the display device and an audio device. After displaying a home screen showing a visual representation of content, channel, and content source selections for a predefined waiting period of time, a bookmark is retrieved. The bookmark remembers the location of streaming content being displayed prior to turning off the display device. The display device streams content starting at a location indicated by the bookmark. An advantage of using a bookmark which can either be stored in a local memory on the client device or stored at a memory in the platform data is the improved efficiency of streaming content on demand.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of the exemplary embodiment of the present invention. While embodiments of the present invention will be described with reference to the Internet, the method and apparatus described herein is equally applicable to other network infrastructures or other data communications environments. In another embodiment, the audible sounds can be delivered through separate speakers from the display device.

Figure 5:
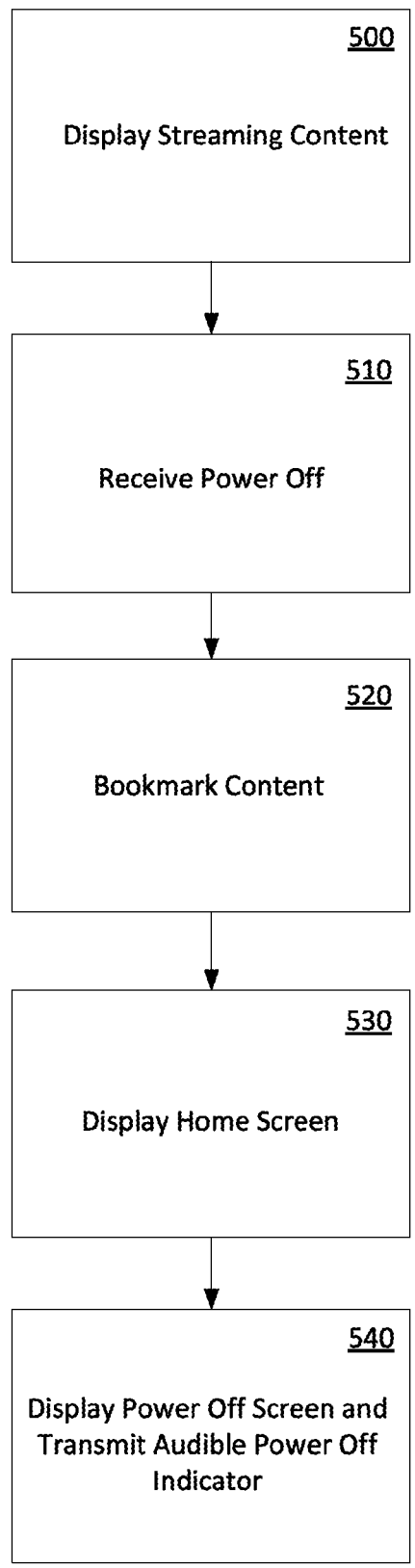
FIG. 5 is a flowchart illustrating a process for powering off a device streaming content to a display in accordance with one embodiment of the present invention.

FIG. 5 is a flowchart illustrating a process of powering off during streaming content to a display device in accordance with one embodiment of the present invention. In Block 500, streaming content is displayed by the display device. In one embodiment, the display device can be either a television or a monitor that is capable of displaying visual images and audible sounds. Alternatively, the display device can also be iPad®, iPhone®, portable smart phone, computer, laptop, and the like.

In Block 510, a power off request is received. The power off request is a request to turn off the display device to prevent further visual display or audible delivery. In one aspect, the power off request or signal can be initiated by a remote control or a computing machine.

In Block 520, the streaming content is bookmarked at the current location of play shortly after receiving the power off request. The streaming content is bookmarked to indicate the current location within the streaming content. In one embodiment, the streaming content is stopped or paused when the power off request is received. For instance, if the streaming content displays a movie, the bookmark remembers the location of the movie where it is stopped.

In Block 530, a home screen is displayed. In one embodiment, the home screen includes a visual representation of content, channel and content sources that are available through the visual display. In one embodiment, the home screen is displayed for long enough duration to allow selection of additional content, channel or content sources which would prevent the powering off of the display device. If additional content, channel or content sources are selected, then the display device would not be turned off and would display the new selection. For example, the user can select a live television program before the duration of displaying the home screen ends. The duration, in one example, is a predefined waiting time period which can be user defined or manufacture defined.

In Block 540, a power off screen and audible power off indicator is transmitted through the display device. In one embodiment, the power off screen indicates that the display device is being shut off. The audible indicator would also indicate that the display is being shut off. In one embodiment, there is a selection of multiple power off screens and audible indicators. In one example, the user could customize the display device to utilize a particular power off screen and audible indicator. In another example, the particular power off screen and audible indicator could be selected and optimized for a particular display device by the manufacturer. It should be noted that the power off screen could be optionally selected as a visual picture. Alternatively, the power off screen is the display screen disconnected from the power supply.

Figure 6:
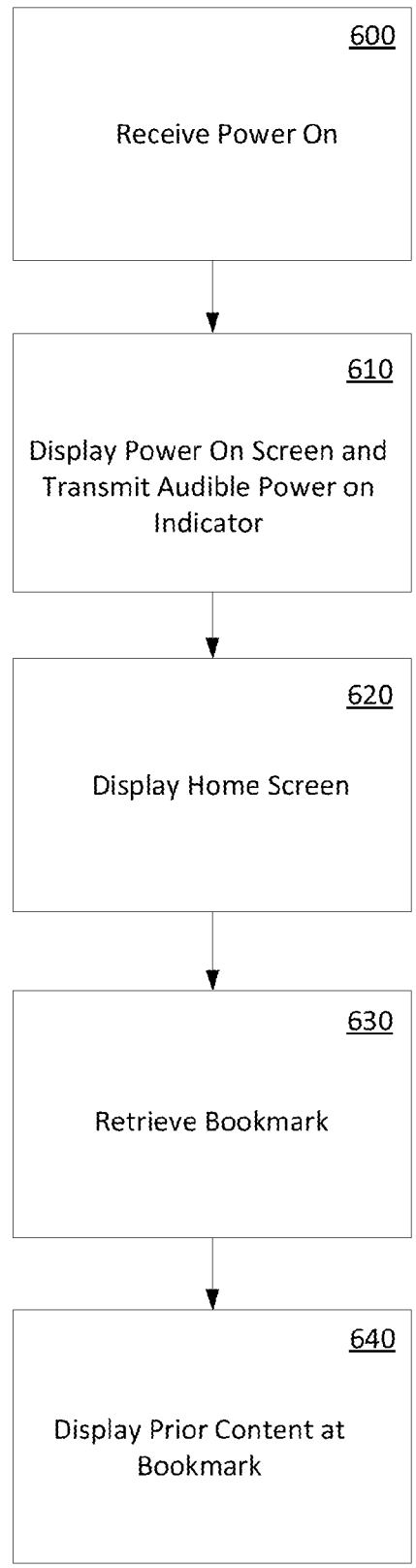
FIG. 6 is a flowchart illustrating a process for powering on a device for streaming content to a display in accordance with one embodiment of the present invention.

FIG. 6 is a flowchart illustrating a process of powering up for content streaming to a display device in accordance with one embodiment of the present invention. In Block 600, a power on request is received. The power on request is a request to turn on the display device. In one aspect, the power on signal or request is initiated by a remote control requesting to turn on the display device which should subsequently display the streaming content that was playing prior to the display device being previously turned off.

In Block 610, a power on screen and audible power on indicator are transmitted through the display device. In one embodiment, the power on screen indicates that the display device is being turned on. The audible indicator would also indicate that the display is being turned on. In one embodiment, there is a selection of multiple power on screens and audible indicators. In one example, the display device can be customized to utilize a particular power on screen and audible indicator, such as by a user. In another example, the particular power on screen and audible indicator could be selected and optimized for a particular display device by the manufacturer.

In Block 620, the home screen is displayed. In one embodiment, the home screen includes a visual representation of content, channel and content sources that are available through the visual display. In one embodiment, the home screen is displayed for a long enough duration to allow selection of additional content, channel or content sources which would prevent the display device from playing the streaming content that was displayed prior to the shutting off the display device. If additional content, channel or content sources are selected, then the new selection would be displayed.

In Block 630, if additional content, channel or content sources were not selected from the home screen within the duration or the predefined waiting period of time, the bookmark is retrieved from the streaming content being displayed prior to turning off the display device. Alternatively, the bookmark can be stored in a local storage.

In Block 640, the prior content at the bookmarked location is displayed through the display device. In one embodiment, the source of the prior content is retrieved with the bookmarked location.

The blocks within FIGS. 5 and 6 are shown only for illustrative purposes. For example, blocks within FIGS. 5 and 6 can be further divided, combined or performed in a different order without limiting the scope of the claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method of displaying images, comprising:
   receiving, at a client device, streamed content from one of a plurality of content providers via a communications network, wherein the client device is coupled to and configured to communicate with each of the plurality of content providers;
   displaying visual images corresponding to the received streamed the received content on a display device;
   receiving a power off signal to power off the display device;
   stopping the streamed content in response to receiving the power off signal to power off the display device;
   creating a bookmark indicating a current location of play of the streamed content after receiving the power off signal; and
   displaying a home screen on the display device with a visual representation of an alternative content selection and a channel selection for a user defined period of time.

2. The method of claim 1, further comprising presenting a power off screen after the predefined period of time expires.

3. The method of claim 2, further comprising sending an audio turn-off signal to stop audio delivery.

4. The method of claim 1, further comprising displaying an alternative visual image if the alternative content selection is selected.

5. The method of claim 1, further comprising displaying a visual presentation if the channel selection is selected.

6. The method of claim 1, further comprising:
   buffering the streamed content for a predefined buffering time interval before displaying the streamed content.

7. The method of claim 1, wherein creating the bookmark further includes storing the bookmark in a local memory of the client device.

8. A streaming media device, comprising:
   a network component configured to receive streamed content from one of a plurality of content providers via a communications network, wherein the network component is further configured to communicate with each of the plurality of content providers via the communications network; and
   a controller configured to
      receive a power off signal to power off a display device;
      stop the streamed content in response to receiving the power off signal to power off the display device;
      create a bookmark indicating a current location of play of the streamed content after receiving the power off signal; and
      present a home screen with a visual representation of an alternative content selection and channel selection for a user defined period of time.

9. The device of claim 8, further comprising a local memory, wherein the controller is further configured to store the bookmark in the local memory.

10. The device of claim 8, further comprising a remote control capable of generating the power off signal.

11. The device of claim 8 in combination with a display device selected from a television, tablet, note book, laptop computer, desktop computer and smart phone.

* * * * *